(12) United States Patent
Terajima

(10) Patent No.: US 11,330,186 B2
(45) Date of Patent: May 10, 2022

(54) BIAXIAL TILTING DEVICE, CAMERA DEVICE, AND ELECTRONIC APPARATUS

(71) Applicant: New Shicoh Motor Co., Ltd., Zhejiang (CN)

(72) Inventor: Kokichi Terajima, Kanagawa (JP)

(73) Assignee: New Shicoh Motor Co., Ltd., Zhejiang (CN)

( * ) Notice: Subject to any disclaimer, the term of this patent is extended or adjusted under 35 U.S.C. 154(b) by 0 days.

(21) Appl. No.: 17/213,353

(22) Filed: Mar. 26, 2021

(65) Prior Publication Data

US 2021/0344842 A1    Nov. 4, 2021

(30) Foreign Application Priority Data

Apr. 30, 2020    (CN) .......................... 202010364383.6

(51) Int. Cl.
| H04N 5/232 | (2006.01) |
| H04N 5/225 | (2006.01) |
| G02B 27/64 | (2006.01) |
| G03B 30/00 | (2021.01) |

(52) U.S. Cl.
CPC ....... *H04N 5/23299* (2018.08); *G02B 27/646* (2013.01); *H04N 5/2252* (2013.01); *H04N 5/23261* (2013.01); *G03B 30/00* (2021.01)

(58) Field of Classification Search
CPC ............. H04N 5/23299; H04N 5/2252; H04N 5/23261; G02B 27/646; G03B 30/00
See application file for complete search history.

(56) References Cited

U.S. PATENT DOCUMENTS

| 2003/0076421 | A1  | 4/2003  | Dutta |
| 2011/0097062 | A1* | 4/2011  | Tsuruta ................ G02B 27/646 396/55 |
| 2016/0209671 | A1* | 7/2016  | Hee .......................... G02B 7/09 |
| 2018/0041709 | A1* | 2/2018  | Konttori ............ H04N 5/23258 |
| 2018/0284570 | A1* | 10/2018 | Minamisawa ....... H04N 5/2251 |
| 2020/0137308 | A1* | 4/2020  | Kulik ................. H04N 5/23287 |
| 2020/0221004 | A1* | 7/2020  | Watanabe ............. H04N 5/349 |
| 2021/0006693 | A1  | 1/2021  | Li |

(Continued)

FOREIGN PATENT DOCUMENTS

| JP | 2000-165738 | 6/2000 |
| JP | 2003-204470 | 7/2003 |
| JP | 2006-329146 | 12/2006 |

(Continued)

OTHER PUBLICATIONS

English language abstract of JP 2012-244614.

(Continued)

*Primary Examiner* — Amy R Hsu
(74) *Attorney, Agent, or Firm* — Fildes & Outland, P.C.

(57) ABSTRACT

Provided is a biaxial tilting device, a camera device, and an electronic apparatus, which enable suppression of shaking of a camera unit. A biaxial tilting device includes: a frame body including a back plate opposed to a bottom surface of a member to be tilted across a space; a plurality of suspension springs made of a shape memory alloy, which are configured to connect the bottom surface and the back plate to each other; and a current supply control unit configured to supply currents to the plurality of suspension springs.

8 Claims, 3 Drawing Sheets

(56) References Cited

U.S. PATENT DOCUMENTS

2021/0112185 A1* 4/2021 Cheng .................. H04N 5/2253

FOREIGN PATENT DOCUMENTS

| | | |
|---|---|---|
| JP | 2007-64063 | 3/2007 |
| JP | 2008-216471 | 9/2008 |
| JP | 2012-244614 | 12/2012 |
| JP | 2015-114484 | 6/2015 |
| WO | 2019/174500 | 9/2019 |

OTHER PUBLICATIONS

Japanese Office Action dated Feb. 1, 2022 in corresponding Japanese application No. 2021-049489 and English translation.
English language machine translation of JP2000-165738.
English language machine translation of JP2007-64063.
English language machine translation of JP2008-216471.
English language machine translation of JP2006-329146.
English language machine translation of JP2015-114484.

* cited by examiner

BIAXIAL TILTING DEVICE, CAMERA DEVICE, AND ELECTRONIC APPARATUS

BACKGROUND OF THE INVENTION

The present invention relates to a biaxial tilting device, a camera device, and an electronic apparatus.

There is known an image shooting device for, for example, a dashboard camera to be mounted to a vehicle, which includes a camera unit and a holder configured to support the camera unit (Japanese Patent Application Laid-open No. 2012-244614).

A dashboard camera to be mounted to a vehicle includes a camera unit. The camera unit is directly mounted to the vehicle, and hence is liable to be shaken due to vibration and shock, winch may be caused while the vehicle is running. As a result, a clear image may not be recorded.

SUMMARY

The present invention has an object to provide a biaxial tilting device, a camera device, and an electronic apparatus, which enable suppression of shaking of a camera unit.

According to one aspect of the present invention, there is provided a biaxial tilting device, including: a frame body including, a back plate opposed to a bottom surface of a member to be tilted across a space; a plurality of suspension springs made of a shape memory alloy, which are configured to connect the bottom surface and the back plate to each other; and a current supply control unit configured to supply currents to the plurality of suspension springs.

It is preferred that each of the plurality of suspension springs be formed by winding a wire into a helical shape.

It is preferred that when the wire is bent back in a middle to form one end of the suspension spring as a whole, both ends of the wire be located on a side corresponding to another end of the suspension spring as a whole.

It is preferred that both of the ends of the wire be electrically connected to the current supply control unit.

It is preferred that both of the ends of the wire be connected to the bottom surface, a bent-back portion of the wire be connected to the back plate, and the current supply control unit be provided in the member to be tilted.

It is preferred that the plurality of suspension springs include at least three suspension springs, and the at least three suspension springs be arranged at equal intervals around a center axis of the bottom surface in a rotationally symmetric manner.

According to another aspect of the present invention, there is provided a camera device, including: a camera unit corresponding to the member to be tilted, and the biaxial tilting device of the above-mentioned invention.

According to another aspect of the present invention, there is provided an electronic apparatus, including the camera device of the above-mentioned invention.

According to the present invention, the member to be tilted, which corresponds to the camera unit, is supported through intermediation of the plurality of suspension springs made of the shape memory alloy in such a manner as to be tillable with respect to the back plate of the frame body. The member to be tilted can be tilted by changing dimensions of the suspension spring through supply of the currents to the suspension springs. As a result, shaking of the member to be tilted can be suppressed.

DESCRIPTION OF THE EMBODIMENTS

An embodiment of the present invention is described with reference to the accompanying drawings. In the embodiment described below, a biaxial tilting device, a camera device, and an electronic apparatus according to the present invention are exemplified. Thus, the present invention is not intended to be limited to the embodiment described below.

Figure 1:
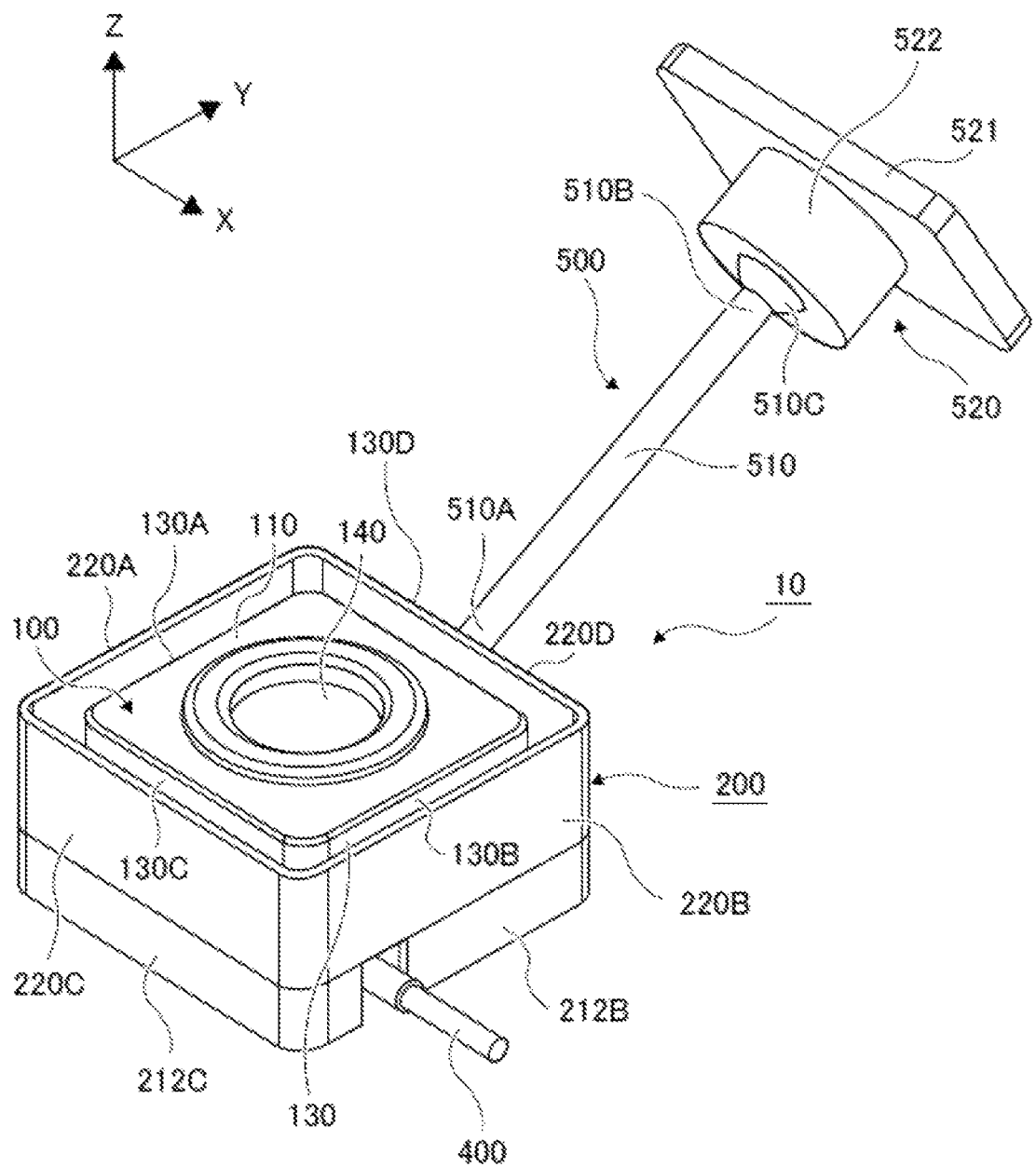
FIG. 1 is an outside perspective view of a dashboard camera according to an embodiment.

As illustrated in FIG. 1, a dashboard camera 10 corresponding to an electronic apparatus according to this embodiment includes a camera device and amounting member 500. The camera device includes a camera unit 100 and a biaxial tilting device. The camera unit 100 corresponds to a member to be tilted. The biaxial tilting device is configured to biaxially tilt the camera unit 100. A power cable 400 is connected to the camera unit 100. The biaxial tilting device includes a frame body 200, four suspension springs 300, and a current supply control unit (not shown). The frame body 200 surrounds the camera unit 100. The four suspension springs 300 connect the camera unit 100 and the frame body 200 to each other. The current supply control unit is configured to supply a current to each of the suspension springs 300.

The camera unit 100 is formed as a box body having a cuboidal shape. The camera unit 100 has a front surface 110, a bottom surface 120, and four side surfaces 130A to 130B (collectively referred to as "side surfaces 130" when not particularly distinguished from each other) The front surface 110 having a substantially square shape extends in an X-Y plane direction. The bottom surface 120 is parallel to the front surface 110. The front surface 110 and the bottom surface 120 have substantially the same shape and the same dimensions. Each of the front surface 110 and the bottom surface 120 may have an oblong shape or a circular shape. Each of the four side surfaces 130A to 130D has an oblong shape having substantially the same size with a predetermined height in a Z-axis direction and a predetermined length in a Y-axis direction or an X-axis direction. Each of the side surfaces 130A and 130B extends in a Y-Z plane direction, and each of the side surfaces 130C and 130D extends in an X-Z plane direction.

A lens 140 having the Z-axis direction as its optical axis is arranged on the front surface 110 of the camera unit 100. Further, an image pickup element (not shown) configured to receive light that is reflected from an object to pass through the lens 140 is arranged in parallel to the lens 140 inside the camera unit 100. The current supply control unit configured to supply a current to each of the suspension springs 300 is provided inside the camera unit 100. Further, a recording medium storage portion (not shown) or a video image control unit (not shown) may be provided inside the camera unit 100. The recording medium storage portion is configured to store a recording medium such as an SD card. The video image control unit is configured to process a video image taken by the image pickup element and store the video image in the recording medium.

The frame body 200 includes a back-side frame body 210 and a frame-body side plate set 220. The back-side frame body 210 includes a back plate 211 having a rectangular shape and four back-side side plates 212A to 212D. The back plate 211 extends in the X-Y plane direction. The back-side side plates 212A to 212D extend from peripheral edge portions of the back plate 211 along the Z-axis direction. The back plate 211 has a size larger than a size of the bottom surface 120 of the camera unit 100 described above. Specifically, lengths of the back plate 211 in the X-axis direction and the Y-axis direction are larger than lengths of the bottom surface 120 in the X-axis direction and the Y-axis direction, respectively.

The frame-body side plate set 220 is a hollow tubular member that surrounds the camera unit 100 and has two open sides in the Z-axis direction. The frame-body side plate set 220 includes four frame-body side plates 220A to 220D. A length of each of the frame-body side plates 720A and 220B in the Y-axis direction is equal to a length of each of the back-side side plates 212A and 212B in the Y-axis direction, and a length of each of the frame-body side plates 220C and 220D in the X-axis direction is equal to a length of each of the back-side side plates 212C and 212D in the X-axis direction. Further, the length of each of the frame-body side plates 220A and 220B in the Y-axis direction is larger than a length of each of the side plates 130A and 130B of the camera unit 100 in the Y-axis direction, and the length of each of the frame-body side plates 220C and 220D in the X-axis direction is larger than a length of each of the side surfaces 130C and 130D in the X-axis direction. Thus, when the camera unit 100 is arranged inside the frame body 200, the side surfaces 130A to 130D are opposed to the frame-body side plates 220A to 220D across a space without being in contact therewith, respectively.

The four suspension springs 300 are arranged between the bottom surface 120 of the camera unit 100 and the back plate 211 of the frame body 200 to connect the bottom surface 120 and the back plate 211 to each other. The four suspension springs 300 are arranged at equal intervals (90-degree intervals) around a center axis of the bottom surface 120 so as to be arranged in a circular alignment or in a rotationally symmetric manner. In this embodiment, two suspension springs 300 (suspension springs 300A and 300B) are arranged in the X-axis direction, and two suspension springs 300 (suspension springs 300C and 300D) are arranged in the Y-axis direction. The suspension spring 300A is arranged at a center of an area of the bottom surface 120, which is closer to the side surface 130A, in the Y-axis direction, and the suspension spring 300B is arranged at a center of an area of the bottom surface 120 of the camera unit 100, which is closer to the side surface 130B, in the Y-axis direction. The suspension spring 300C is arranged at a center of an area of the bottom surface 120, which is closer to the side surface 130C, in the X-axis direction, and the suspension spring 300D is arranged at a center of an area of the bottom surface 120, which is closer to the side surface 130D, in the X-axis direction.

The four suspension springs 300 may be arranged in the vicinity of four corners of the bottom surface 120 of the camera unit 100, respectively. Further, the number of the suspension springs 300 according to the present invention is not limited to four. At least three suspension springs 300 are only needed to be arranged at equal intervals around the center axis of the bottom surface 120 in a rotationally symmetric manner.

Figure 3:
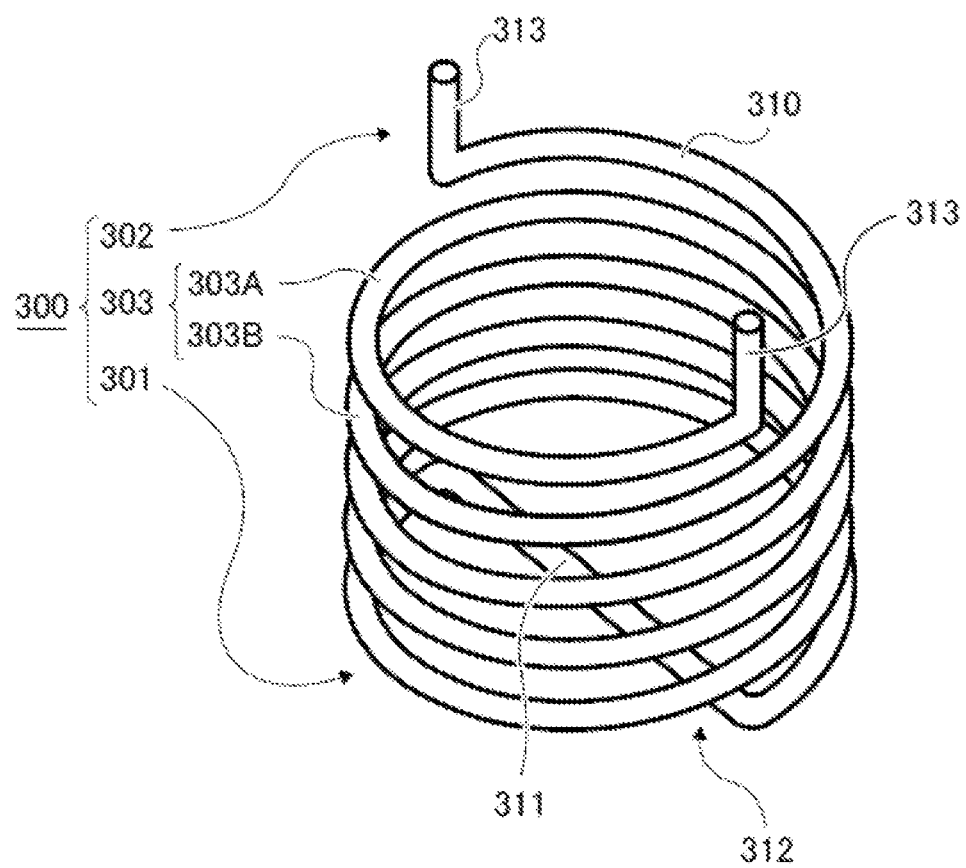
FIG. 3 is an outside perspective view of a suspension spring.

As illustrated in FIG. 3, each of the suspension springs 300 includes, when viewed as a whole, a back plate-side end portion 301, a camera unit-side end portion 302, and a spring main body portion 303. The spring main body portion 303 is located between the back plate-side end portion 301 and the camera unit-side end portion 302. Each of the suspension springs 300 is formed by bending back a wire 310 made of a shape memory alloy in a middle and winding the wire in a helical manner. A central portion 311 of the wire 310 is beat back to form a bent-back portion 312, which serves as the back plate-side end portion 301 corresponding to one end of the suspension spring 300 as a whole. Specifically, the spring main body portion 303 includes a first spring main body portion 303A and a second spring main body portion 303B, each being formed in a helical shape. The first spring main body portion 303A and the second spring main body portion 303B are coaxially combined with each other. The bent-back portion 312 linearly extends in parallel to the back plate 211, and couples the first spring main body portion 303A and the second spring main body portion 303B to each other. Both end portions 313 of the wire 310 are located on the side opposite to the beat-back portion 312 to serve as the camera unit-side end portion 302 corresponding to another end of the suspension spring 300 as a whole. The end portions 313 are formed by bending an end of the first spring main body portion 303A and an end of the second spring main body portion 303B in the Z-axis direction. It is desirable that the end portions 313 are formed on the sides opposite to each other with respect to a center axis of a helix.

Both of the end portions 313 of the wire 310 are fixed to the bottom surface 120 of the camera unit 100, and are electrically connected to the current supply control unit (not shown) provided in the camera unit 100. Meanwhile, the bent-back portion 312 is fixed to the back plate 211. Thus, control currents are supplied to the suspension springs 300 only from the current supply control unit. Hence, currents are not required to be supplied from the back-side frame body 210 side, it is preferred that the wire 310 be covered with an insulating material except for both of the end portions 313.

Figure 2:
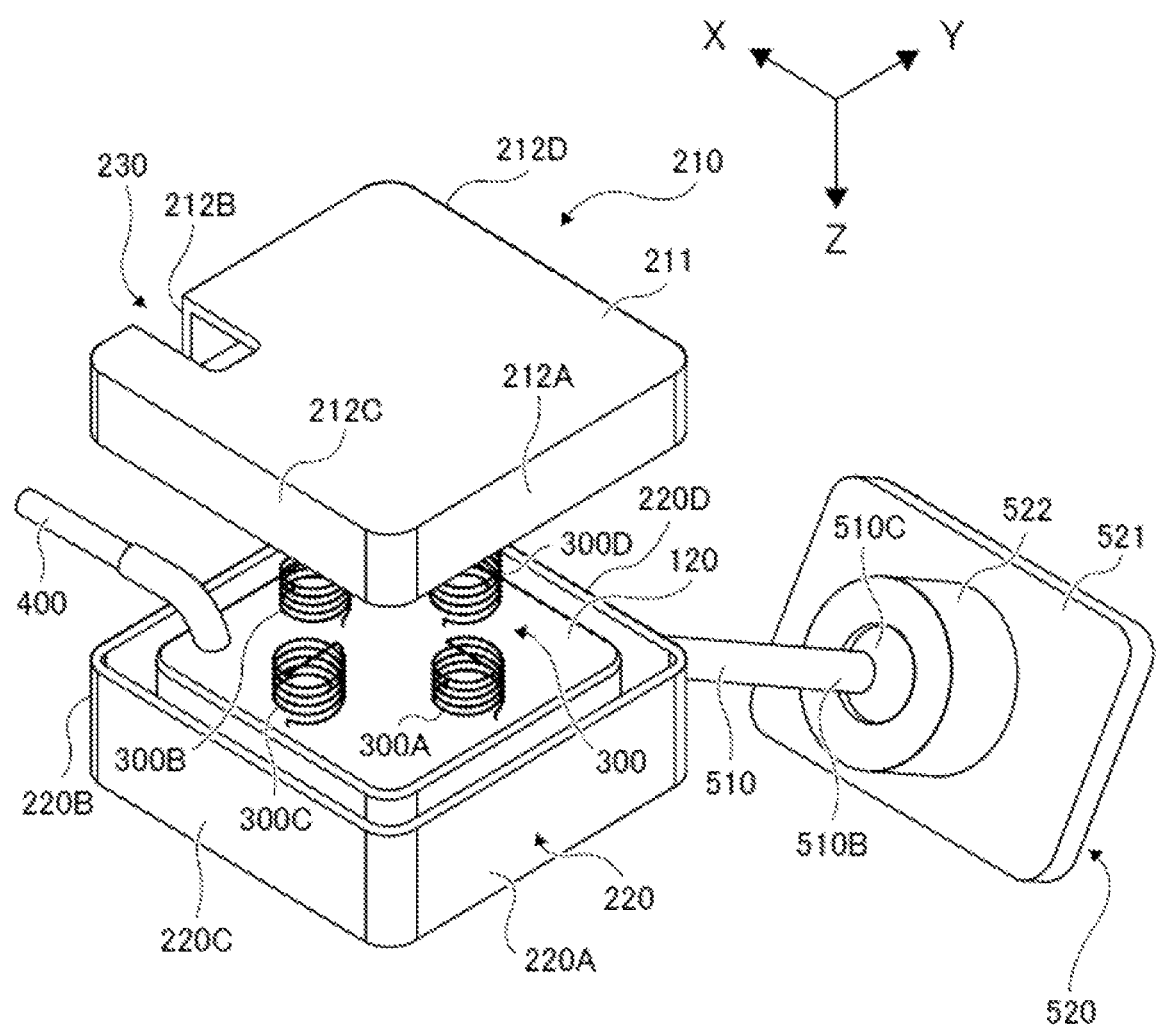
FIG. 2 is an exploded perspective view of the dashboard camera of FIG. 1 under a state in which a back plate is separated when viewed in a direction opposite to the direction in which the dashboard camera is viewed in FIG. 1.

As illustrated in FIG. 2, the power cable 400 is connected to the bottom surface 120 of the camera unit 100. The power cable 400 is configured to supply electric power to the current supply control unit, the recording medium storage portion, and the video image control unit, which are stored in the camera unit 100. A cutout portion 230 is formed in the back-side side plate 212B and the back plate 211. The cutout portion 230 is a lead-out port for leading the power cable 400 to an outside.

As illustrated in FIG. 1 and FIG. 2, the mounting member 500 includes a bar member 510 and a fixing member 520. One end 510A of the bar member 510 is fixed to the frame body 200, for example, to the frame-body side plate 220D. A spherical body 510C is formed at another end 510B of the bar member 510. The fixing member 520 includes a fixing plate 521 and a cylindrical portion 522. The fixing plate 521 has an attachment surface to be attached to, for example, a windshield of a vehicle. The cylindrical portion 522 projects to a side opposite to the attachment surface. The cylindrical portion 523 and the spherical body 510C form a so-called ball joint. The cylindrical portion 522 holds the spherical body 510C in an enclosing manner. The bar member 510 is supported to have a given degree of freedom that allows a direction and an angle thereof to be adjusted with respect to the fixing member 520.

An example of assembly of the above-mentioned dashboard camera 10 according to this embodiment is now described. The power cable 400 and the camera unit-side end portions 302 of the suspension springs 300 are connected to the bottom surface 120 of the camera unit 100. At the time of connecting, the bent-back portions 312 of the suspension springs 300A and 300B that are arranged in alignment with each other in the X-axis direction are located in such a manner as to extend along the X-axis direction. Similarly, the bent-back portions 312 of the suspension springs 300C and 300D that are arranged in alignment with each other in the Y-axis direction are located in such a manner as to extend along the Y-axis direction. Next, the back plate-side end portions 301 of the suspension springs 300 are connected to the back plate 211. As a result, the camera unit 100 is brought into a state of being suspended from the frame body 200 through intermediation of the suspension springs 300.

Next, the camera unit 100 is inserted into the frame-body side plate set 220. Then, the frame-body side plate set 220 is mounted to the back-side frame body 210. More specifically, rear ends of the frame-side side plates 220A to 220D in the Z-axis direction are brought into abutment against front ends of the back-side side plates 212A to 212D of the back-side frame body 210 in the Z-axis direction, and are fixed thereto, respectively. At the time of fixing, the power cable 400 is led to an outside of the frame body 200 through the cutout portion 230 of the back-side frame body 210. As a result, the camera unit 100 is brought into a state of being tiltable inside the frame body 200.

Further, the one end 510A of the bar member 510 of the mounting member 500 is fixed and connected to one frame-body side plate (the frame-body side plate 220D in FIG. 1 and FIG. 2) of the frame-body side plate set 220 of the frame body 200, and the spherical body 510C formed at the another end 510B is inserted into the cylindrical portion 522 of the fixing member 520.

Next, an operation of the dashboard camera 10 according to this embodiment is described. For example, predetermined currents are caused to flow in advance from the current supply control unit through the four suspension springs 300. When the current caused to flow through the suspension spring 300A is increased and the current caused to flow through the suspension spring 300B, which is arranged in alignment with the suspension spring 300A in the X-axis direction, is decreased, the suspension spring 300A is contracted along the Z-axis direction to attract the camera unit 100 toward the back plate 211 of the frame body 200. Further, the suspension spring 300B, which is another one of the suspension springs 300 arranged in the X-axis direction, is stretched along the Z-axis direction to separate the camera unit 100 from the back plate 211 of the frame body 200. As a result, the camera unit 100 is turned about the Y axis (counterclockwise in FIG. 2).

When the currents to be increased and decreased are switched for the suspension springs 300A and 300B to stretch the suspension spring 300A and contract the suspension spring 300B, the camera unit 100 is turned clockwise about the Y axis.

Similarly, when the same current control is performed on the two suspension springs 300C and 300D that are arranged in alignment with each other in the Y-axis direction, the camera unit 100 can be turned about the X axis. In this manner, the camera unit 100 can be turned about the X axis and the Y axis.

Further, instead of causing the predetermined currents to flow through the suspension springs 300 in advance, the camera unit 100 may be turned by causing a necessary current to flow through the suspension spring 300 to be contracted.

The current supply control unit of the camera unit 100 includes an angular velocity detection device (not shown). When vibration or a shock caused while the vehicle is running is transmitted to the camera unit 100, an angular velocity is detected by the angular velocity detection device as a component about the X axis and a component about the Y axis. The current supply control unit controls the currents to flow through the suspension springs 300A to 300D in accordance with a magnitude and a direction of an angular velocity of the detected component about the X axis and/or the detected component about the Y axis to thereby stretch/contract or contract the suspension springs 300A to 300D. In this manner, the camera unit 100 is tilted about the X axis and/or the Y axis to be returned to an original direction. In this manner, the camera unit 100 is isolated from shaking of the vehicle.

As a structure of each of the suspension springs 300, both of the end portions 313 of the wire 310 may be arranged as the back plate-side end portion 301, and the bent-back portion 312 may be arranged as the camera unit-side end portion 302. Further, one of the end portions 313 of the wire 310 may be fixed to the back plate 211 as the back plate-side end portion 310, and another one of the end portions 313 may be fixed to the bottom surface 120 of the camera unit 100 as the camera unit-side end portion 302. In this case, the spring main body portion 303 is formed to have a shape with a single helix. The embodiment have been described with an example in which the present invention is applied to the dashboard camera. However, the present invention is applicable not only to the dashboard camera but also to, for example, other camera apparatus to be mounted to a bicycle or a drone.

What is claimed is:

1. A biaxial tilting device, comprising:
a frame body including a back plate opposed to a bottom surface of a member to be tilted across a space;
a plurality of suspension springs made of a shape memory alloy and each being formed by winding a wire into a helical shape which wire is bent back in a middle to form one end of the suspension spring as a whole, both ends of the wire are located on a side corresponding to another end of the suspension spring as a whole, which are configured to connect the bottom surface and the back plate to each other; and
a current supply control unit configured to supply currents to the plurality of suspension springs.

2. The biaxial tilting device according to claim 1, wherein both of the ends of the wire are electrically connected to the current supply control unit.

3. The biaxial tilting device according to claim 2, wherein both of the ends of the wire are connected to the bottom surface, a bent-back portion of the wire is connected to the back plate, and the current supply control unit is provided in the member to be tilted.

4. The biaxial tilting device according to claim 3, wherein the plurality of suspension springs include at least three suspension springs, and the at least three suspension springs are arranged at equal intervals around a center axis of the bottom surface in a rotationally symmetric manner.

5. The biaxial tilting device according to claim 2, wherein the plurality of suspension springs include at least three suspension springs, and the at least three suspension springs are arranged at equal intervals around a center axis of the bottom surface in a rotationally symmetric manner.

6. The biaxial tilting device according to claim 1, wherein the plurality of suspension springs include at least three suspension springs, and the at least three suspension springs are arranged at equal intervals around a center axis of the bottom surface in a rotationally symmetric manner.

7. A camera device, comprising:
a camera unit corresponding to the member to be tilted; and
the biaxial tilting device of claim 1.

8. An electronic apparatus, comprising the camera device of claim 7.

* * * * *